United States Patent
Hong et al.

(10) Patent No.: US 8,957,630 B2
(45) Date of Patent: Feb. 17, 2015

(54) REFLECTED ENERGY MANAGEMENT APPARATUS AND METHOD FOR RESONANCE POWER TRANSMISSION

(75) Inventors: Young Tack Hong, Seongnam-si (KR); Nam Yun Kim, Seoul (KR); Sang Wook Kwon, Seongnam-si (KR); Eun Seok Park, Suwon-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 751 days.

(21) Appl. No.: 12/968,005

(22) Filed: Dec. 14, 2010

(65) Prior Publication Data

US 2011/0156635 A1 Jun. 30, 2011

(30) Foreign Application Priority Data

Dec. 29, 2009 (KR) ........................ 10-2009-0133286

(51) Int. Cl.
*H02J 7/00* (2006.01)
*H02J 5/00* (2006.01)
*H02M 7/00* (2006.01)

(52) U.S. Cl.
CPC ..................................... *H02J 5/005* (2013.01)
USPC ........... 320/108; 320/104; 320/107; 307/104; 363/125

(58) Field of Classification Search
CPC .................................. H02J 7/025; H02J 5/005
USPC ........................................... 320/104, 107, 108
See application file for complete search history.

(56) References Cited

U.S. PATENT DOCUMENTS

| 7,825,543 B2 * | 11/2010 | Karalis et al. ................. 307/104 |
| 2004/0100325 A1 * | 5/2004 | van Amerom ................ 330/144 |
| 2005/0162125 A1 * | 7/2005 | Yu et al. ........................ 320/108 |
| 2008/0268796 A1 * | 10/2008 | Fukuda et al. ............. 455/127.1 |
| 2009/0284220 A1 * | 11/2009 | Toncich et al. ................ 320/108 |
| 2010/0207572 A1 * | 8/2010 | Kirby et al. .................... 320/101 |
| 2011/0084652 A1 * | 4/2011 | Julstrom et al. .............. 320/108 |

FOREIGN PATENT DOCUMENTS

| JP | 06-311057 | 11/1994 |
| JP | 2008-252418 | 10/2008 |
| JP | 2008-278096 | 11/2008 |
| JP | 2008-278097 | 11/2008 |
| JP | 2008-295242 | 12/2008 |

* cited by examiner

*Primary Examiner* — Drew A Dunn
*Assistant Examiner* — Nathaniel Pelton
(74) *Attorney, Agent, or Firm* — NSIP Law

(57) ABSTRACT

Provided is a reflected energy management apparatus for resonance power transmission. The reflected energy management apparatus for resonance power transmission may include a source resonator configured to transmit a power to a target resonator, and a reflected power management unit configured to: detect a reflected wave corresponding to the power transmitted to the target resonator, and to generate a power using the detected reflected wave.

20 Claims, 15 Drawing Sheets

240

US 8,957,630 B2

REFLECTED ENERGY MANAGEMENT APPARATUS AND METHOD FOR RESONANCE POWER TRANSMISSION

CROSS-REFERENCE TO RELATED APPLICATION(S)

This application claims the benefit under 35 U.S.C. §119(a) of Korean Patent Application No. 10-2009-0133286, filed on Dec. 29, 2009, in the Korean Intellectual Property Office, the entire disclosure of which is incorporated herein by reference for all purposes.

BACKGROUND

1. Field

The following description relates to a wireless power transmission system, for example, a resonance power transmission system. More particularly, the following description relates to a reflected energy management apparatus for resonance power transmission.

2. Description of Related Art

With the development of Information Technology (IT), a variety of portable electronic devices have been released and distribution of the portable electronic devices has also increased. Due to characteristics of the portable electronic devices, battery performance of a corresponding portable electronic device is becoming an issue. In addition to the portable electronic devices, home electronic appliances have a function of wirelessly transmitting data and can be supplied with power over a power line. Wireless energy transfer or wireless power occurs where electrical energy is transmitted from a power source to an electrical load without interconnecting wires.

Currently, research has been conducted on wireless power transmission technologies that may wirelessly supply a power. Due to characteristics of a wireless power transmission environment, a reflected energy exists inside or outside a system at all times during resonance power transmission.

SUMMARY

In one general aspect, there is provided a reflected energy management apparatus for resonance power transmission, the reflected energy management apparatus including: a source resonator configured to transmit a power to a target resonator, and a reflected power management unit configured to: detect a reflected wave corresponding to the power transmitted to the target resonator, and generate a power using the detected reflected wave.

In the reflected energy management apparatus, the reflected power management unit may include: a coupler configured to detect the reflected wave by electrical coupling, a rectifier configured to generate a direct current (DC) power by rectifying the reflected wave detected by the coupler, and a charging unit configured to store the DC power.

In the reflected energy management apparatus, the reflected power management unit may include: a coupler configured to detect the reflected wave by electrical coupling, a rectifier configured to generate a DC voltage by rectifying the reflected wave detected by the coupler, and a DC-to-DC (DC/DC) converter configured to provide the DC voltage as an auxiliary power of a resonance power transmission apparatus.

The reflected energy management apparatus may further include: a circulator configured to: provide the source resonator with a power input from a resonance power transmission apparatus, and provide the reflected power management unit with the reflected wave.

In another general aspect, there is provided a reflected energy management apparatus for resonance power transmission, the reflected energy management apparatus including: a coupler configured to detect a reflected wave by electrical coupling, the reflected wave being generated in a resonance power transmission system, a rectifier configured to generate a DC power by rectifying the reflected wave detected by the coupler, and a charging unit configured to store the DC power.

In another general aspect, there is provided a reflected energy management method for resonance power transmission, the method including: transmitting, by a source resonator, a power to a target resonator, and detecting, by a reflected power management unit, a reflected wave corresponding to the power transmitted to the target resonator, and generating, by the reflected power management unit, a power using the detected reflected wave.

The method may further include: detecting the reflected wave by electrical coupling, generating a direct current (DC) power by rectifying the detected reflected wave, and storing the DC power.

The method may further include: detecting the reflected wave by electrical coupling, generating a DC voltage by rectifying the detected reflected wave, and providing the DC voltage as an auxiliary power of a resonance power transmission apparatus.

The method may further include: providing the source resonator with a power input from a resonance power transmission apparatus, and providing the reflected power management unit with the reflected wave.

In another general aspect, there is provided a reflected energy management method for resonance power transmission, the method including: detecting, by a coupler, a reflected wave by electrical coupling, the reflected wave being generated in a resonance power transmission system, generating, by a rectifier, a DC power by rectifying the reflected wave detected by the coupler, and storing, by a charging unit, the DC power.

Other features and aspects may be apparent from the following detailed description, the drawings, and the claims.

Figure 1:
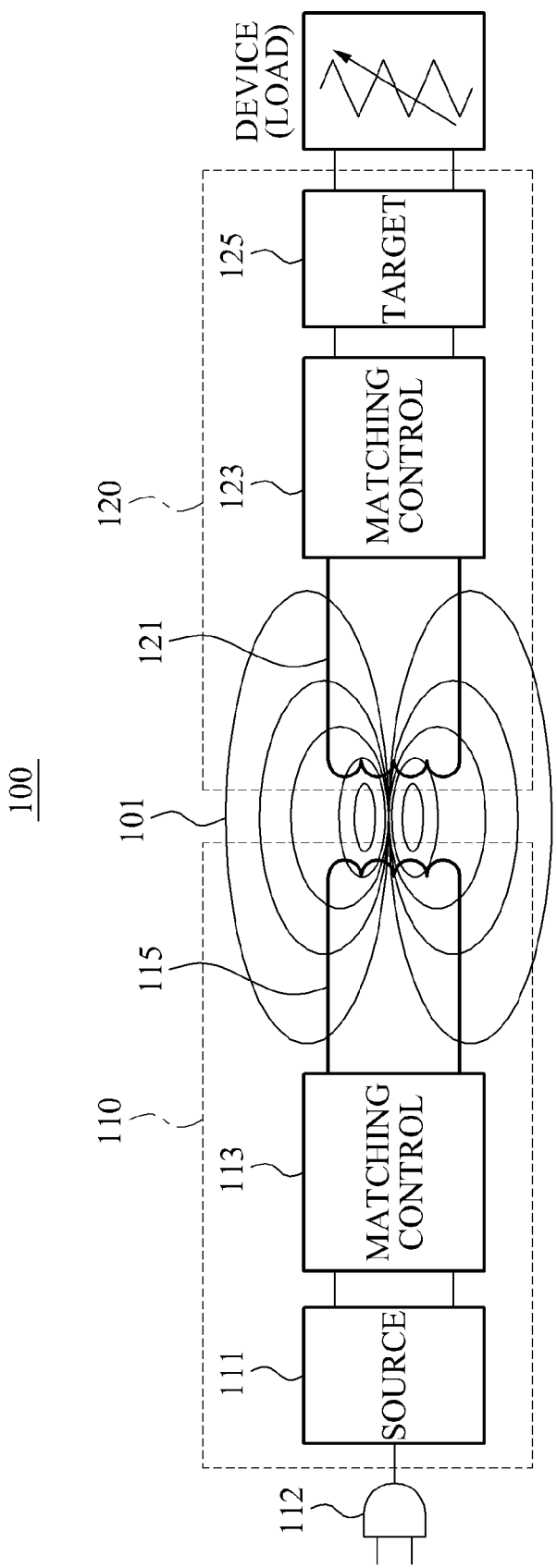
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a wireless power transmission system.

As an example, a wireless power transmitted using the wireless power transmission system may be presumed as a resonance power.

Referring to FIG. 1, a wireless power transmission system 100 may have a source-target structure including a source and a target. The wireless power transmission system 100 may include a resonance power transmitter 110 corresponding to the source and a resonance power receiver 120 corresponding to the target.

The resonance power transmitter 110 may include a source unit 111 and a source resonator 115. The source unit 111 may receive energy from an external voltage supplier, e.g., wall plug 112, to generate a resonance power. The resonance power transmitter 110 may further include a matching control 113 to perform resonance frequency or impedance matching.

The source unit 111 may include an alternating current (AC)-to-AC (AC/AC) converter, an AC-to-direct current (DC) (AC/DC) converter, and a DC-to-AC (DC/AC) inverter. The AC/AC converter may adjust, to a desired level, a signal level of an AC signal input from an external device. The AC/DC converter may output a DC voltage at a predetermined level by rectifying an AC signal output from the AC/AC converter. The DC/AC inverter may generate an AC signal in a band of a few megahertz (MHz) to tens of MHz by quickly switching a DC voltage output from the AC/DC converter. Other frequency bands may also be generated.

The matching control 113 may set at least one of a resonance bandwidth of the source resonator 115 and an impedance matching frequency of the source resonator 115. Although not illustrated in figures, the matching control 113 may include at least one of a source resonance bandwidth setting unit and a source matching frequency setting unit. The source resonance bandwidth setting unit may set the resonance bandwidth of the source resonator 115. The source matching frequency setting unit may set the impedance matching frequency of the source resonator 115. As an example, a Q-factor of the source resonator 115 may be determined based on setting of the resonance bandwidth of the source resonator 115 or setting of the impedance matching frequency of the source resonator 115.

The source resonator 115 may transfer electromagnetic energy to a target resonator 121. For example, the source resonator 115 may transfer the resonance power to the resonance power receiver 120 through magnetic coupling 101 with the target resonator 121. The source resonator 115 may resonate within the set resonance bandwidth.

The resonance power receiver 120 may include the target resonator 121, a matching control 123 to perform resonance frequency or impedance matching, and a target unit 125 to transfer the received resonance power to a load.

The target resonator 121 may receive the electromagnetic energy from the source resonator 115. The target resonator 121 may resonate within the set resonance bandwidth.

The matching control 123 may set at least one of a resonance bandwidth of the target resonator 121 and an impedance matching frequency of the target resonator 121. Although not illustrated in figures, the matching control 123 may include at least one of a target resonance bandwidth setting unit and a target matching frequency setting unit. The target resonance bandwidth setting unit may set the resonance bandwidth of the target resonator 121. The target matching frequency setting unit may set the impedance matching frequency of the target resonator 121. As an example, a Q-factor of the target resonator 121 may be determined based on setting of the resonance bandwidth of the target resonator 121 or setting of the impedance matching frequency of the target resonator 121.

The target unit 125 may transfer the received resonance power to the load. The target unit 125 may include an AC/DC converter and/or a DC/DC converter. The AC/DC converter may generate a DC voltage by rectifying an AC signal transmitted from the source resonator 115 to the target resonator 121. The DC/DC converter may supply a rated voltage to a device or the load by adjusting a voltage level of the DC voltage.

The source resonator 115 and the target resonator 121 may be configured, for example, in a helix coil structured resonator, a spiral coil structured resonator, a meta-structured resonator, and the like.

Referring back to FIG. 1, a process of controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

In a wireless power transmission employing a resonance scheme, the resonance bandwidth may be an important factor. When the Q-factor, taking into consideration all of a change in a distance between the source resonator 115 and the target resonator 121, a change in the resonance impedance, impedance mismatching, a reflected signal, and the like, is Qt, Qt may have an inverse-proportional relationship with the resonance bandwidth, as given by Equation 1.

$$\frac{\Delta f}{f_0} = \frac{1}{Qt}$$
$$= \Gamma_{S,D} + \frac{1}{BW_S} + \frac{1}{BW_D}$$
[Equation 1]

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. For example, the BW-factor may indicate either $1/BW_S$ or $1/BW_D$.

Due to an external effect, for example, a change in the distance between the source resonator 115 and the target resonator 121, a change in a location of at least one of the source resonator 115 and the target resonator 121, and the like, impedance mismatching between the source resonator 115 and the target resonator 121 may occur. The impedance mismatching may be a direct cause in decreasing an efficiency of power transfer. When a reflected wave corresponding to a transmission signal that is partially reflected and returned is detected, the matching control 113 may determine the impedance mismatching has occurred, and may perform impedance matching. The matching control 113 may change a resonance frequency by detecting a resonance point through a waveform analysis of the reflected wave. The matching control 113 may determine, as the resonance frequency, a frequency having a minimum amplitude in the waveform of the reflected wave.

The source resonator 115 and the target resonator 121 of FIG. 1 may be configured as shown in FIGS. 7 through 12.

Figure 2:
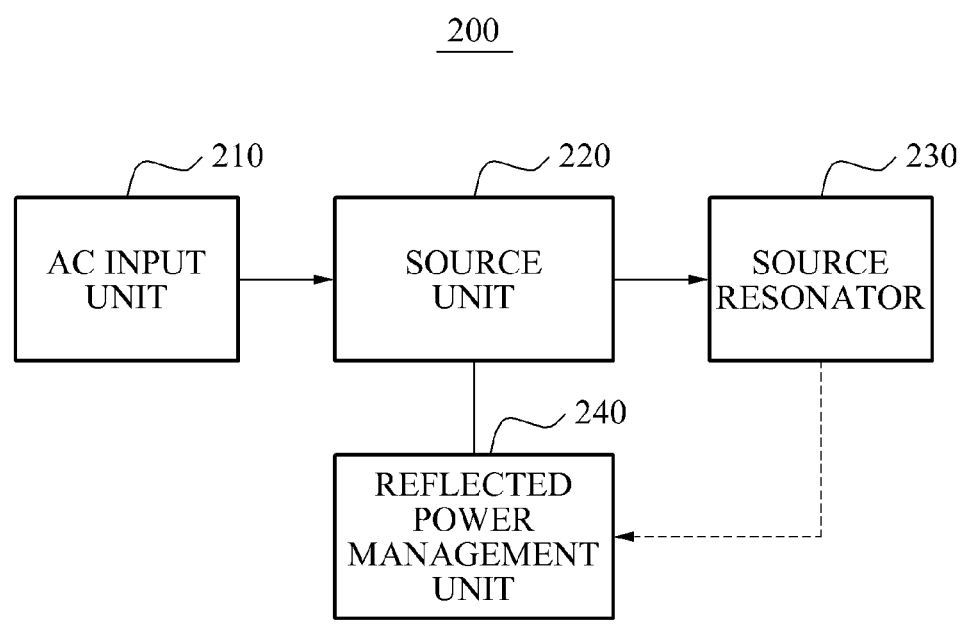
FIG. 2 is a diagram illustrating an example of a reflected energy management apparatus for resonance power transmission.

FIG. 2 illustrates a reflected energy management apparatus 200 for resonance power transmission. As an example, the reflected energy management apparatus 200 may be included in a wireless power transmission apparatus.

Referring to FIG. 2, the reflected energy management apparatus 200 may include an AC input unit 210, a source unit 220, a source resonator 230, and a reflected power management unit 240.

The AC input unit 210 may generate an AC power, and may provide the generated AC power to the source unit 220.

The source unit 220 may include a circuit to convert the AC power input from the AC input unit 210 into a DC power and to transmit the DC power through the source resonator 230. For example, the source unit 220 may include an AC/DC converter, a frequency generator, a power amplifier, and a coupler.

The source resonator 230 may transmit a resonance power to a target resonator.

The reflected power management unit 240 may detect a reflected wave corresponding to the power transmitted to the target resonator, and may generate a power using the detected reflected wave. As an example, the reflected wave corresponding to the power transmitted to the target resonator may be determined by a Voltage Standing Wave Ratio (VSWR) of the source resonator 230. Herein, a power generated by a reflected wave may be referred to as a "reflected wave power" or a "reflected energy." A Power Transfer Efficiency (PTE) by a reflected power may be expressed by Equation 2.

$$PTE = \frac{|S_{21}|^2}{1-|S_{11}|^2} \quad \text{[Equation 2]}$$

In Equation 2, $S_{11}$ denotes a reflected power, and $S_{21}$ denotes a transmission power. As a result, the PTE may be determined based on a level of impedance matching in a resonance frequency.

Figure 3:
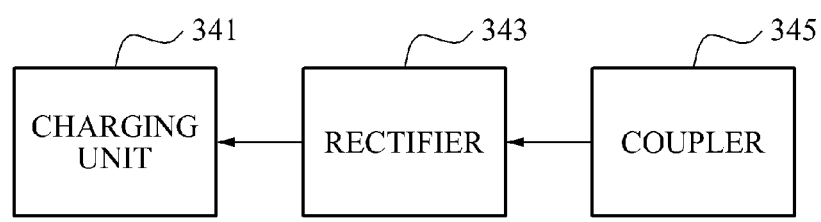
FIG. 3 is a diagram illustrating an example of a reflected power management unit of FIG. 2.

FIG. 3 illustrates an example of the reflected power management unit 240 of FIG. 2.

Referring to FIG. 3, the reflected power management unit 240 may include a charging unit 341, a rectifier 343, and a coupler 345.

The coupler 345 may detect a reflected wave by electrical coupling, and may transfer the detected reflected wave to the rectifier 343. As an example, the reflected wave may correspond to a power transmitted to a target resonator.

The rectifier 343 may generate a DC power by rectifying the reflected wave detected by the coupler 345. As an example, the rectifier 343 may include, for example, at least one diode, a resistance, a condenser, and a coil. The rectifier 343 may include a smoothing circuit, and may convert a high frequency signal to a DC signal using the smoothing circuit.

The charging unit 341 may store the DC power generated by the rectifier 343. Energy stored in the charging unit 341 may be supplied to a communication module (not illustrated), or a main processor, or may be provided as an auxiliary power of a resonance power transmission apparatus.

Figure 4:
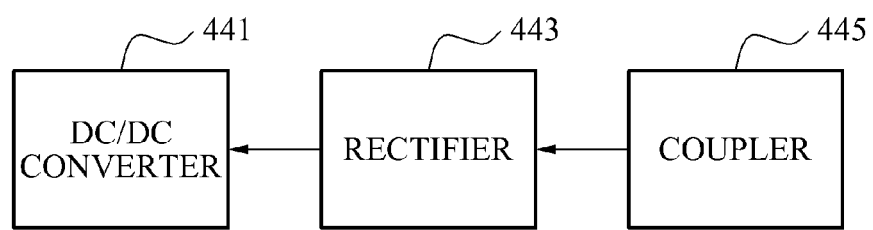
FIG. 4 is a diagram illustrating another example of a reflected power management unit of FIG. 2.

FIG. 4 illustrates another example of the reflected power management unit 240 of FIG. 2.

The reflected power management unit 240 of FIG. 4 may include a DC/DC converter 441, instead of the charging unit 341 of FIG. 3. A rectifier 443 and a coupler 445 of FIG. 4 may respectively have the same configuration as the rectifier 343 and the coupler 345 of FIG. 3.

To provide a DC voltage as an auxiliary power of a resonance power transmission apparatus, the DC/DC converter 441 may supply the DC voltage to a communication module or a main processor, without a need for the DC voltage rectified by rectifier 443 to pass through a charger.

Although not illustrated in FIGS. 3 and 4, the reflected power management unit 240 may include both the DC/DC converter 441 and the charging unit 341. In other words, depending on embodiments, a DC voltage obtained by the DC/DC converter 441 performing a DC/DC conversion may be stored in the charging unit 341.

Figure 5:
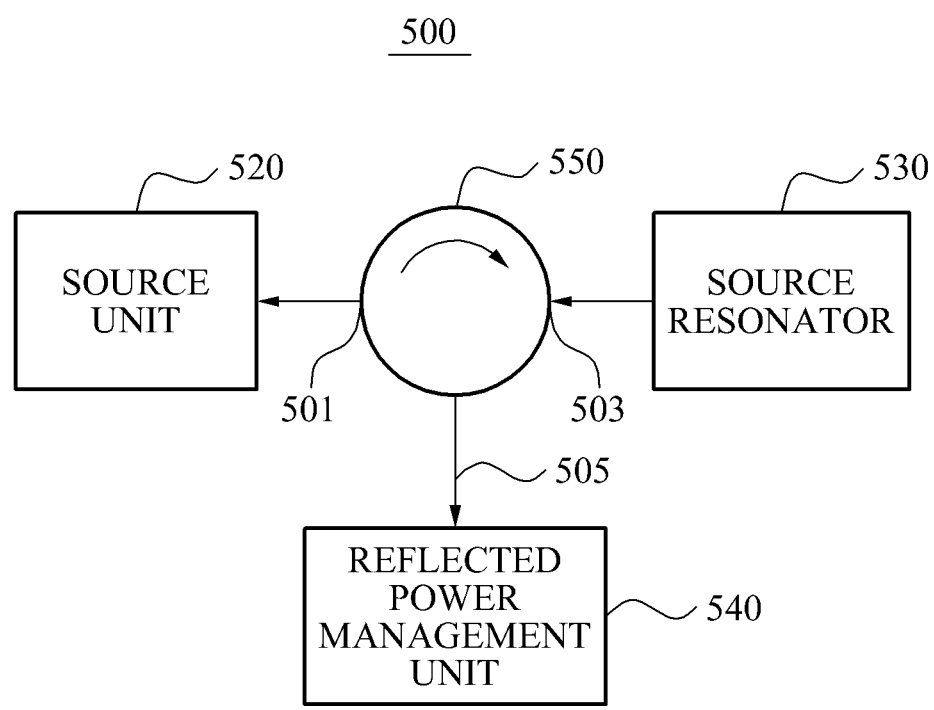
FIG. 5 is a diagram illustrating another example of a reflected energy management apparatus for resonance power transmission.

FIG. 5 illustrates a reflected energy management apparatus 500 for resonance power transmission.

Referring to FIG. 5, the reflected energy management apparatus 500 may include a source unit 520, a source resonator 530, a reflected power management unit 540, and a circulator 550. As an example, the source unit 520, the source resonator 530, and the reflected power management unit 540 of FIG. 5 may respectively perform the same functions as the source unit 220, the source resonator 230, and the reflected power management unit 240 of FIG. 2.

The circulator 550 may provide the source resonator 530 with a power input from a resonance power transmission apparatus, that is, a power input from the source unit 520, and may provide the reflected power management unit 540 with a reflected wave generated by the source resonator 530. For example, a first terminal 501 of the circulator 550 may be connected to an output terminal of the source unit 520, and a second terminal 503 of the circulator 550 may be connected to the source resonator 530. Additionally, a third terminal 505 of the circulator 550 may be connected to the reflected power management unit 540. Accordingly, the circulator 550 may output a signal input from the first terminal 501 to the source resonator 530, and may output a signal input from the third terminal 505 to the reflected power management unit 540.

Figure 6:
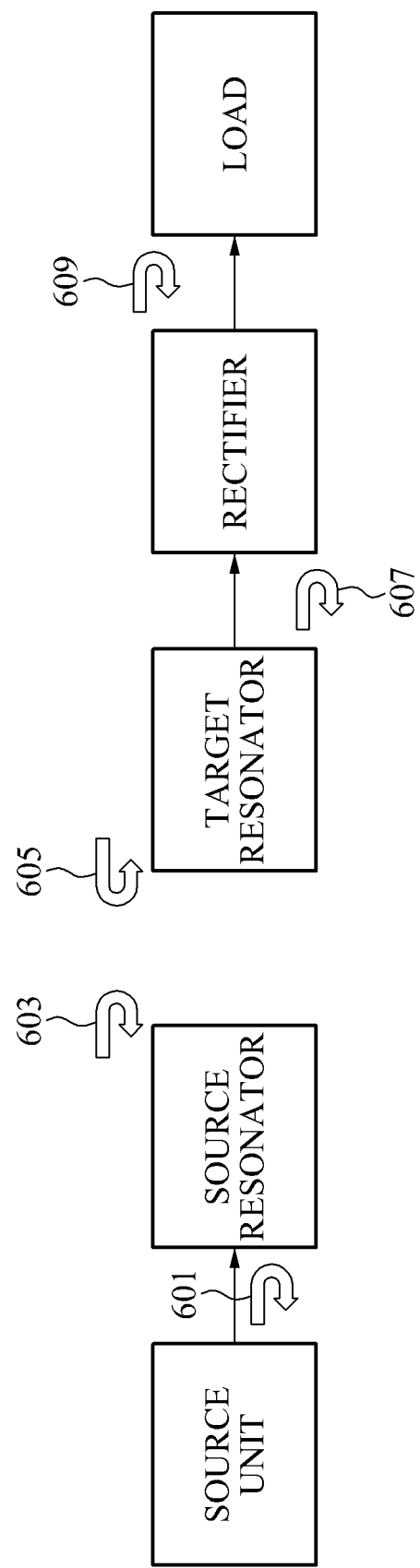
FIG. 6 is a diagram illustrating examples of areas in which a great amount of reflected power is generated in a transmission and reception system.

A reflected power in a resonance power transmission system may be generated in various areas, as shown in FIG. 6.

Referring to FIG. 6, a reflected power may be generated by an impedance mismatch occurring in an area 601 between a source unit and a source resonator in a transmission system, by impedance mismatches occurring in areas 603 and 605 between the source resonator and a target resonator, by an impedance mismatch occurring in an area 607 between the target resonator and a rectifier in a reception system, and by an impedance mismatch occurring in an area 609 between the rectifier and a load in the reception system. As an example, most of the total reflected power in the resonance power transmission system may be generated in the areas 601, 603, 605, 607, and 609. Accordingly, a reflected power management unit according to embodiments may be included in the areas 601, 603, 605, 607, and 609. The reflected power management unit may include a coupler to detect, by electrical coupling, a reflected wave generated in the resonance power transmission system, a rectifier to generate a DC power by rectifying the reflected wave detected by the coupler, and a charging unit to store the DC power.

A source resonator and/or a target resonator may be configured as a helix coil structured resonator, a spiral coil structured resonator, a meta-structured resonator, and the like.

Hereinafter, related terms will be described for concise understanding. All the materials may have a unique magnetic permeability, that is, Mu (μ), and a unique permittivity, that is, epsilon (∈). The magnetic permeability indicates a ratio between a magnetic flux density occurring with respect to a given magnetic field in a corresponding material and a magnetic flux density occurring with respect to the given magnetic field in a vacuum state. The magnetic permeability and the permittivity may determine a propagation constant of a corresponding material in a given frequency or a given wavelength. An electromagnetic characteristic of the corresponding material may be determined based on the magnetic permeability and the permittivity. In particular, a material having a magnetic permeability or a permittivity absent in nature and being artificially designed is referred to as a "metamaterial." The metamaterial may be easily disposed in a resonance state even in a relatively large wavelength area or a relatively low frequency area. For example, even though a material size rarely varies, the metamaterial may be easily disposed in the resonance state.

Figure 7:
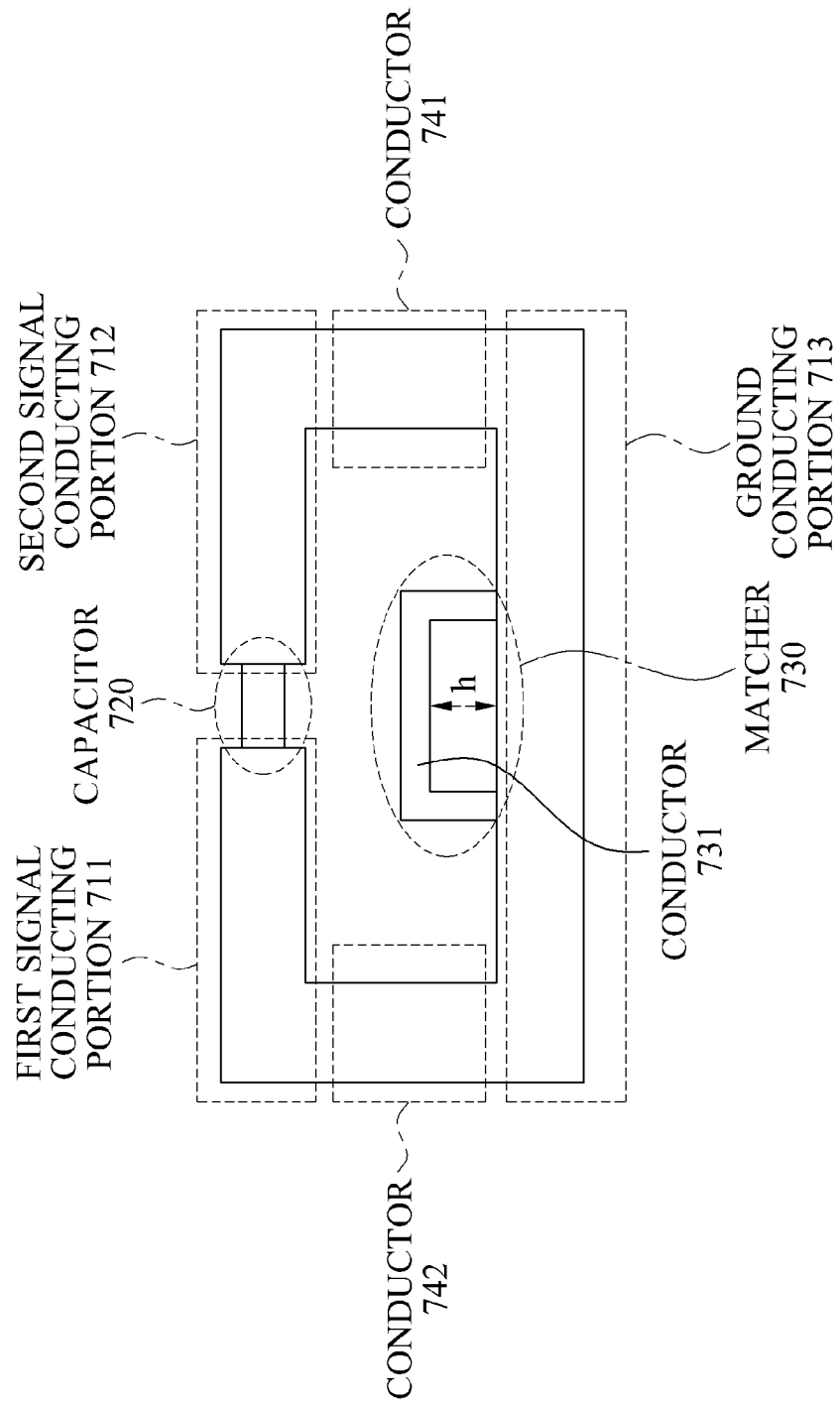
FIGS. 7 through 13B are diagrams illustrating various examples of a resonator structure.

FIG. 7 illustrates an example of a resonator 700 having a two-dimensional (2D) structure.

Referring to FIG. 7, the resonator 700 having the 2D structure may include a transmission line, a capacitor 720, a matcher 730, and conductors 741 and 742. The transmission line may include a first signal conducting portion 711, a second signal conducting portion 712, and a ground conducting portion 713.

The capacitor 720 may be inserted in series between the first signal conducting portion 711 and the second signal conducting portion 712, such that an electric field may be confined within the capacitor 720. As an example, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. A conductor disposed in an upper portion of the transmission line may be separated into and may be referred to as the "first signal conducting portion 711" and the "second signal conducting portion 712." A conductor disposed in the lower portion of the transmission line may be referred to as the "ground conducting portion 713."

As shown in FIG. 7, the resonator 700 may have the 2D structure. The transmission line may include the first signal conducting portion 711 and the second signal conducting portion 712 in the upper portion of the transmission line, and may include the ground conducting portion 713 in the lower portion of the transmission line. The first signal conducting portion 711 and the second signal conducting portion 712 may be disposed to face the ground conducting portion 713. The current may flow through the first signal conducting portion 711 and the second signal conducting portion 712.

One end of the first signal conducting portion 711 may be shorted to the conductor 742, and another end of the first signal conducting portion 711 may be connected to the capacitor 720. One end of the second signal conducting portion 712 may be grounded to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other, such that the resonator 700 may have an electrically closed-loop structure. The term "loop structure" may include a polygonal structure, for example, a circular structure, a rectangular structure, and the like. "Having a loop structure" may indicate being electrically closed.

The capacitor 720 may be inserted into an intermediate portion of the transmission line. For example, the capacitor 720 may be inserted into a space between the first signal conducting portion 711 and the second signal conducting portion 712. The capacitor 720 may have a shape of a lumped element, a distributed element, and the like. In particular, a distributed capacitor having the shape of the distributed element may include zigzagged conductor lines and a dielectric material having a relatively high permittivity between the zigzagged conductor lines.

When the capacitor 720 is inserted into the transmission line, the resonator 700 may have a property of a metamaterial. The metamaterial indicates a material having a predetermined electrical property that cannot be found in nature and thus, may have an artificially designed structure. An electromagnetic characteristic of all the naturally-occurring materials may have a unique magnetic permeability or a unique permittivity. Most materials may have a positive magnetic permeability or a positive permittivity. In the case of most materials, a right hand rule may be applied to an electric field, a magnetic field, and a pointing vector and thus, the corresponding materials may be referred to as "right handed materials (RHMs)." However, the metamaterial has a magnetic permeability or a permittivity absent in nature and thus, may be classified into an epsilon negative (ENG) material, a mu negative (MNG) material, a double negative (DNG) material, a negative refractive index (NRI) material, a left-handed (LH) material (or "LHM"), and the like, based on a sign of the corresponding permittivity or magnetic permeability.

When a capacitance of the capacitor 720 inserted as the lumped element is appropriately determined, the resonator 700 may have the characteristic of the metamaterial. As the resonator 700 may have a negative magnetic permeability by appropriately adjusting the capacitance of the capacitor 720, the resonator 700 may also be referred to as an "MNG resonator." Various criteria may be applied to determine the capacitance of the capacitor 720. For example, the various criteria may include a criterion for enabling the resonator 700 to have the characteristic of the metamaterial, a criterion for enabling the resonator 700 to have a negative magnetic permeability in a target frequency, a criterion for enabling the resonator 700 to have a zeroth order resonance characteristic in the target frequency, and the like. Based on at least one criterion, e.g., among the aforementioned criteria, the capacitance of the capacitor 720 may be determined.

The resonator 700, also referred to as the "MNG resonator 700," may have a zeroth order resonance characteristic of having, as a resonance frequency, a frequency when a propagation constant is "0". Since the resonator 700 may have the zeroth order resonance characteristic, the resonance frequency may be independent with respect to a physical size of the MNG resonator 700. By appropriately designing the capacitor 720, the MNG resonator 700 may sufficiently change the resonance frequency. Accordingly, the physical size of the MNG resonator 700 may not be changed.

In a near field, the electric field may be concentrated on the capacitor 720 inserted into the transmission line. Accordingly, due to the capacitor 720, the magnetic field may become dominant in the near field. The MNG resonator 700 may have a relatively high Q-factor using the capacitor 720 of the lumped element. Thus, it may be possible to enhance an efficiency of power transmission. As an example, the Q-factor may indicate a level of an ohmic loss or a ratio of a reactance with respect to a resistance in the wireless power transmission. It may be understood that the efficiency of the wireless power transmission may increase according to an increase in the Q-factor.

The MNG resonator 700 may include the matcher 730 for impedance matching. The matcher 730 may appropriately adjust a strength of a magnetic field of the MNG resonator 700. An impedance of the MNG resonator 700 may be determined by the matcher 730. A current may flow in the MNG resonator 700 via a connector, or may flow out from the MNG resonator 700 via the connector. The connector may be connected to the ground conducting portion 713 or the matcher 730. The power may be transferred through coupling without using a physical connection between the connector and the ground conducting portion 713 or the matcher 730.

For example, as shown in FIG. 7, the matcher 730 may be positioned within the loop formed by the loop structure of the resonator 700. The matcher 730 may adjust the impedance of the resonator 700 by changing the physical shape of the matcher 730. For example, the matcher 730 may include the conductor 731 for the impedance matching in a location separate from the ground conducting portion 713 by a distance h. The impedance of the resonator 700 may be changed by adjusting the distance h.

Although not illustrated in FIG. 7, a controller may be provided to control the matcher 730. In one example, the matcher 730 may change the physical shape of the matcher 730 based on a control signal generated by the controller. For example, the distance h between the conductor 731 of the matcher 730 and the ground conducting portion 713 may increase or decrease based on the control signal. Accordingly, the physical shape of the matcher 730 may be changed, such that the impedance of the resonator 700 may be adjusted. The controller may generate the control signal based on various factors, which will be described later.

As shown in FIG. 7, the matcher 730 may be configured as a passive element such as the conductor 731. Depending on embodiments, the matcher 730 may be configured as an active element such as a diode, a transistor, and the like. When the active element is included in the matcher 730, the active element may be driven based on the control signal generated by the controller, and the impedance of the resonator 700 may be adjusted based on the control signal. For example, a diode that is a type of the active element may be included in the matcher 730. The impedance of the resonator 700 may be adjusted, depending on whether the diode is in an on state or in an off state.

Although not illustrated in FIG. 7, a magnetic core may be further provided to pass through the MNG resonator 700. The magnetic core may perform a function of increasing a power transmission distance.

Figure 8:
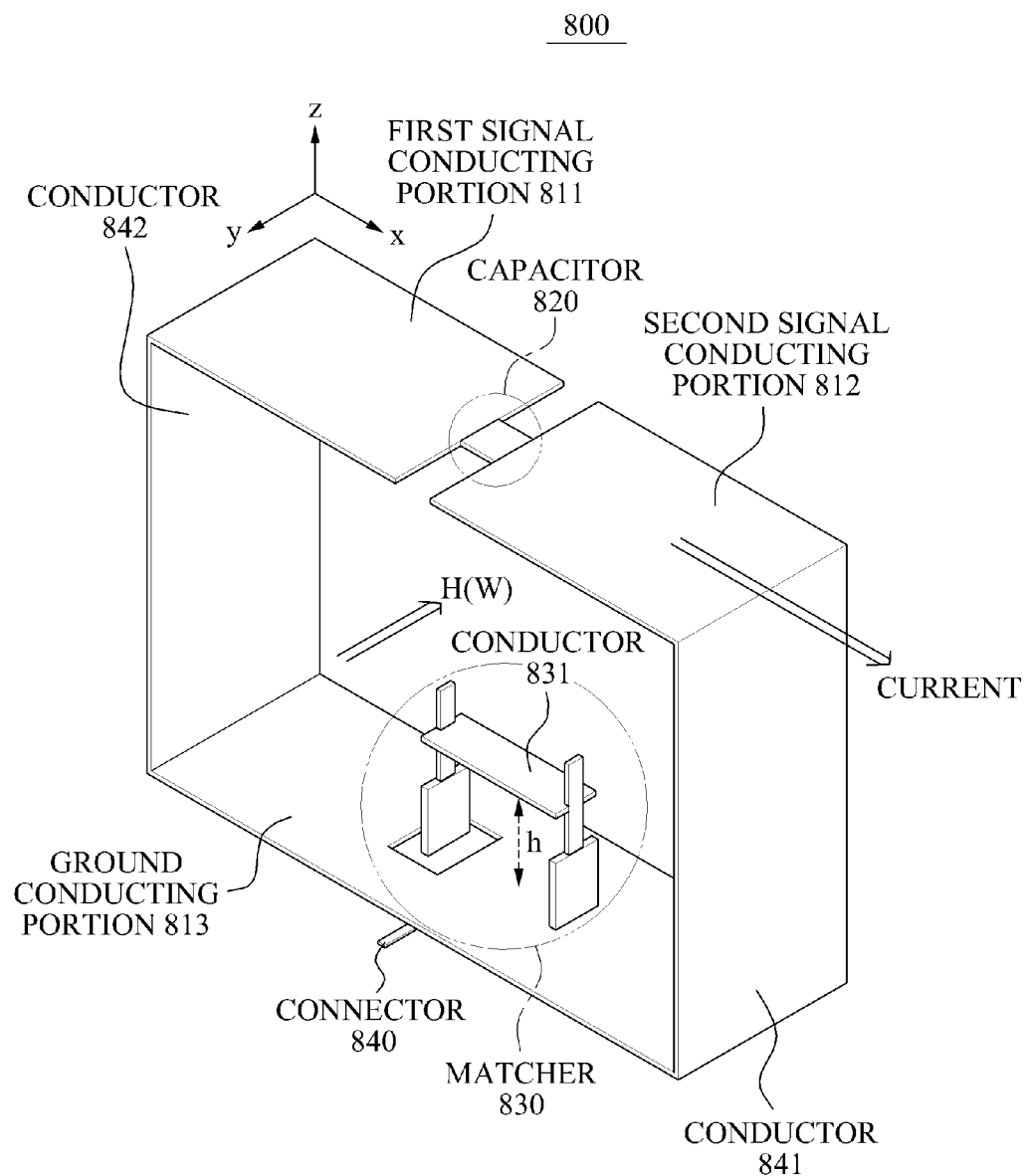

FIG. 8 illustrates an example of a resonator 800 having a three-dimensional (3D) structure.

Referring to FIG. 8, the resonator 800 having the 3D structure may include a transmission line and a capacitor 820. The transmission line may include a first signal conducting portion 811, a second signal conducting portion 812, and a ground conducting portion 813. The capacitor 820 may be inserted in series between the first signal conducting portion 811 and the second signal conducting portion 812 of the transmission link, such that an electric field may be confined within the capacitor 820.

As shown in FIG. 8, the resonator 800 may have the 3D structure. The transmission line may include the first signal conducting portion 811 and the second signal conducting portion 812 in an upper portion of the resonator 800, and may include the ground conducting portion 813 in a lower portion of the resonator 800. The first signal conducting portion 811 and the second signal conducting portion 812 may be disposed to face the ground conducting portion 813. A current may flow in an x-direction through the first signal conducting portion 811 and the second signal conducting portion 812. Due to the current, a magnetic field H(W) may be formed in a −y-direction. Alternatively, unlike the diagram of FIG. 8, the magnetic field H(W) may be formed in a +y-direction.

One end of the first signal conducting portion 811 may be shorted to the conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, such that the resonator 800 may have an electrically closed-loop structure. The term "loop structure" may include a polygonal structure, for example, a circular structure, a rectangular structure, and the like. "Having a loop structure" may indicate being electrically closed.

As shown in FIG. 8, the capacitor 820 may be inserted between the first signal conducting portion 811 and the second signal conducting portion 812. The capacitor 820 may be inserted into a space between the first signal conducting portion 811 and the second signal conducting portion 812. The capacitor 820 may have a shape of a lumped element, a distributed element, and the like. In particular, a distributed capacitor having the shape of the distributed element may include zigzagged conductor lines and a dielectric material having a relatively high permittivity between the zigzagged conductor lines.

As the capacitor 820 is inserted into the transmission line, the resonator 800 may have a property of a metamaterial.

When a capacitance of the capacitor inserted as the lumped element is appropriately determined, the resonator 800 may have the characteristic of the metamaterial. As the resonator 800 may have a negative magnetic permeability by appropriately adjusting the capacitance of the capacitor 820, the resonator 800 may also be referred to as an "MNG resonator." Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion enabling the resonator 800 to have a zeroth order resonance characteristic in the target frequency, and the like. Based on at least one criterion, e.g., among the aforementioned criteria, the capacitance of the capacitor 820 may be determined.

The resonator 800, also referred to as the "MNG resonator 800," may have a zeroth order resonance characteristic of having, as a resonance frequency, a frequency when a propagation constant is "0". Since the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not be changed.

Referring to the MNG resonator 800 of FIG. 8, in a near field, the electric field may be concentrated on the capacitor 820 inserted into the transmission line. Accordingly, due to the capacitor 820, the magnetic field may become dominant in the near field. In particular, since the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820. Thus, the magnetic field may become further dominant.

Also, the MNG resonator 800 may include the matcher 830 for impedance matching. The matcher 830 may appropriately adjust the strength of magnetic field of the MNG resonator 800. An impedance of the MNG resonator 800 may be determined by the matcher 830. A current may flow in the MNG resonator 800 via a connector 840, or may flow out from the MNG resonator 800 via the connector 840. The connector 840 may be connected to the ground conducting portion 813 or the matcher 830.

For example, as shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance matching in a location separate from the ground conducting portion 813 by a distance h. The impedance of the resonator 800 may be changed by adjusting the distance h.

Although not illustrated in FIG. 8, a controller may be provided to control the matcher 830. In one example, the matcher 830 may change the physical shape of the matcher 830 based on a control signal generated by the controller. For example, the distance h between the conductor 831 of the matcher 830 and the ground conducting portion 813 may increase or decrease based on the control signal. Accordingly, the physical shape of the matcher 830 may be changed, such that the impedance of the resonator 800 may be adjusted. The distance h between the conductor 831 of the matcher 830 and the ground conducting portion 813 may be adjusted using a variety of schemes. As one example, a plurality of conductors may be included in the matcher 830 and the distance h may be adjusted by adaptively activating one of the conductors. As another example, the distance h may be adjusted by adjusting the physical location of the conductor 831 up and down. The distance h may be controlled based on the control signal of the controller. The controller may generate the control signal using various factors. An example of the controller generating the control signal will be described later.

As shown in FIG. 8, the matcher 830 may be configured as a passive element such as the conductor 831. Depending on embodiments, the matcher 830 may be configured as an active element such as a diode, a transistor, and the like. When the active element is included in the matcher 830, the active element may be driven based on the control signal generated by the controller, and the impedance of the resonator 800 may be adjusted based on the control signal. For example, a diode that is a type of the active element may be included in the matcher 830. The impedance of the resonator 800 may be adjusted, depending on whether the diode is in an on state or in an off state.

Although not illustrated in FIG. 8, a magnetic core may be further provided to pass through the resonator 800 configured as the MNG resonator. The magnetic core may perform a function of increasing a power transmission distance.

Figure 9:
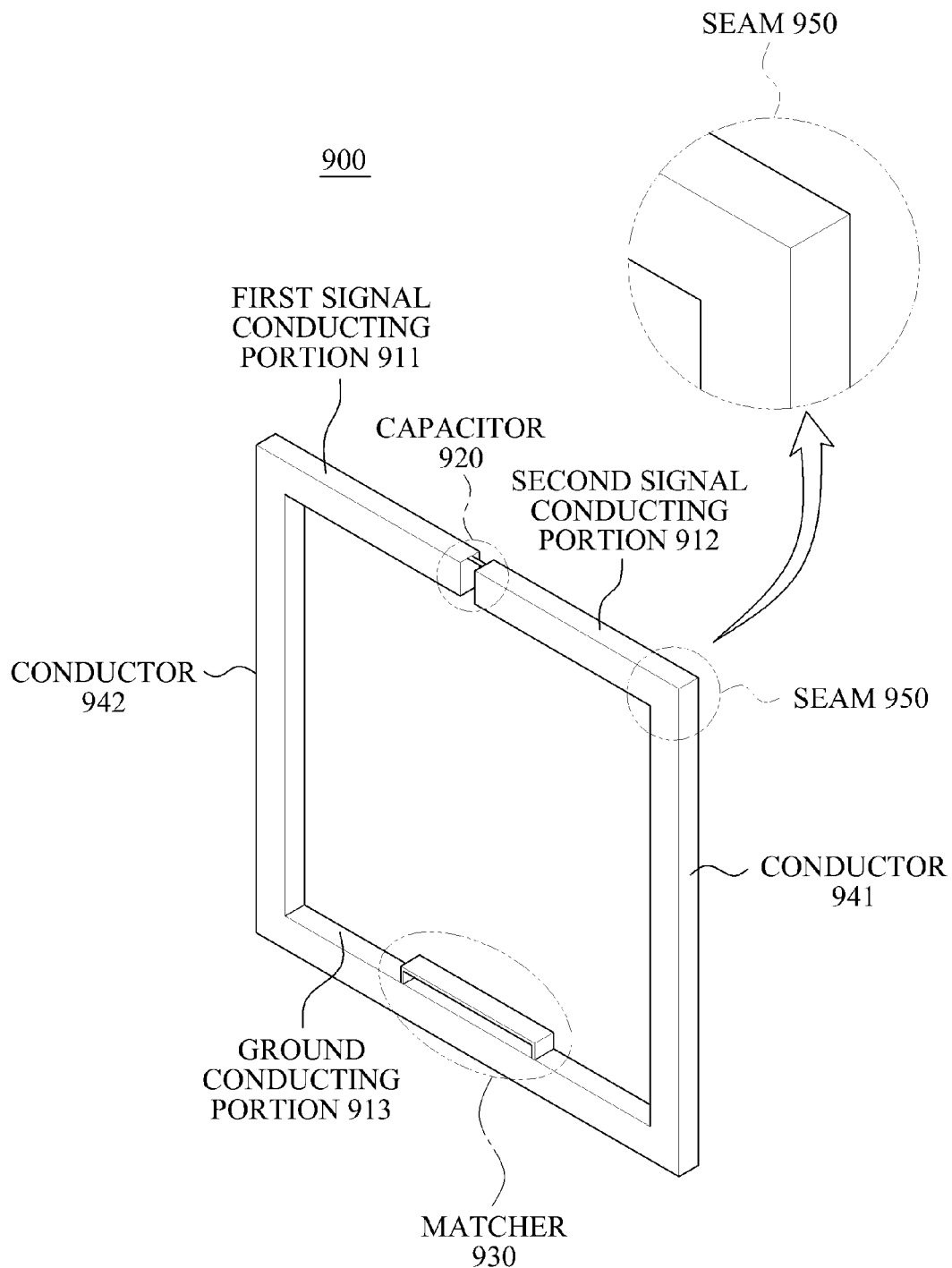

FIG. 9 illustrates an example of a resonator 900 for a wireless power transmission configured as a bulky type.

Referring to FIG. 9, a first signal conducting portion 911 and a second signal conducting portion 912 may be integrally formed instead of being separately manufactured and may be connected to each other. Similarly, the second signal conducting portion 912 and the conductor 941 may also be integrally manufactured.

When the second signal conducting portion 912 and the conductor 941 are separately manufactured and then are connected to each other, a loss of conduction may occur due to a seam 950. The second signal conducting portion 912 and the conductor 941 may be connected to each other without using a separate seam, that is, may be seamlessly connected to each other. Accordingly, it may be possible to decrease a conductor loss caused by the seam 950. Accordingly, the second signal conducting portion 912 and a ground conducting portion 913 may be seamlessly and integrally manufactured. Similarly, the first signal conducting portion 911 and the ground conducting portion 913 may be seamlessly and integrally manufactured.

Referring to FIG. 9, a type of a seamless connection connecting at least two partitions into an integrated form is referred to as a "bulky type."

Figure 10:
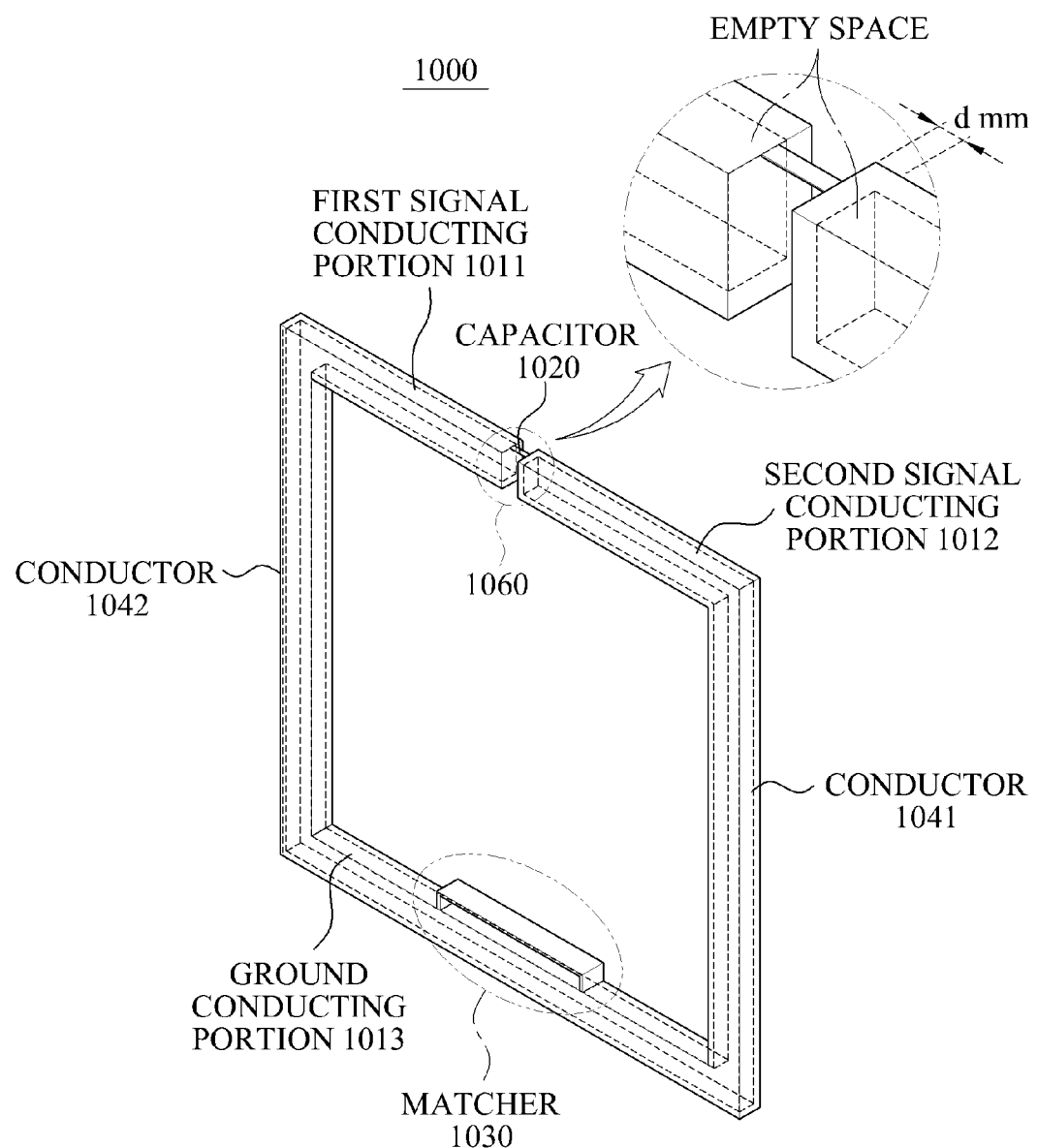

FIG. 10 illustrates an example of a resonator 1000 for a wireless power transmission, configured as a hollow type.

Referring to FIG. 10, each of a first signal conducting portion 1011, a second signal conducting portion 1012, a ground conducting portion 1013, and conductors 1041 and 1042 of the resonator 1000 configured as the hollow type may include an empty space inside.

In a given resonance frequency, an active current may be modeled to flow in only a portion of the first signal conducting portion 1011 instead of all of the first signal conducting portion 1011, a portion of the second signal conducting portion 1012 instead of all of the second signal conducting portion 1012, a portion of the ground conducting portion 1013 instead of all of the ground conducting portion 1013, and a portion of the conductors 1041 and 1042 instead of all of the conductors 1041 and 1042. For example, when a depth of each of the first signal conducting portion 1011, the second signal conducting portion 1012, the ground conducting portion 1013, and the conductors 1041 and 1042 is significantly deeper than a corresponding skin depth in the given resonance frequency, it may be ineffective. The significantly deeper depth may increase a weight or manufacturing costs of the resonator 1000.

Accordingly, in the given resonance frequency, the depth of each of the first signal conducting portion 1011, the second signal conducting portion 1012, the ground conducting portion 1013, and the conductors 1041 and 1042 may be appropriately determined based on the corresponding skin depth of each of the first signal conducting portion 1011, the second signal conducting portion 1012, the ground conducting portion 1013, and the conductors 1041 and 1042. When each of the first signal conducting portion 1011, the second signal conducting portion 1012, the ground conducting portion 1013, and the conductors 1041 and 1042 has an appropriate depth deeper than a corresponding skin depth, the resonator 1000 may become light, and manufacturing costs of the resonator 1000 may also decrease.

For example, as shown in FIG. 10, the depth of the second signal conducting portion 1012 may be determined as "d" mm and d may be determined according to $$d = \frac{1}{\sqrt{\pi f \mu \sigma}}.$$

As an example, f denotes a frequency, μ denotes a magnetic permeability, and σ denotes a conductor constant. When the first signal conducting portion 1011, the second signal conducting portion 1012, the ground conducting portion 1013, and the conductors 1041 and 1042 are made of a copper and have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

Figure 11:
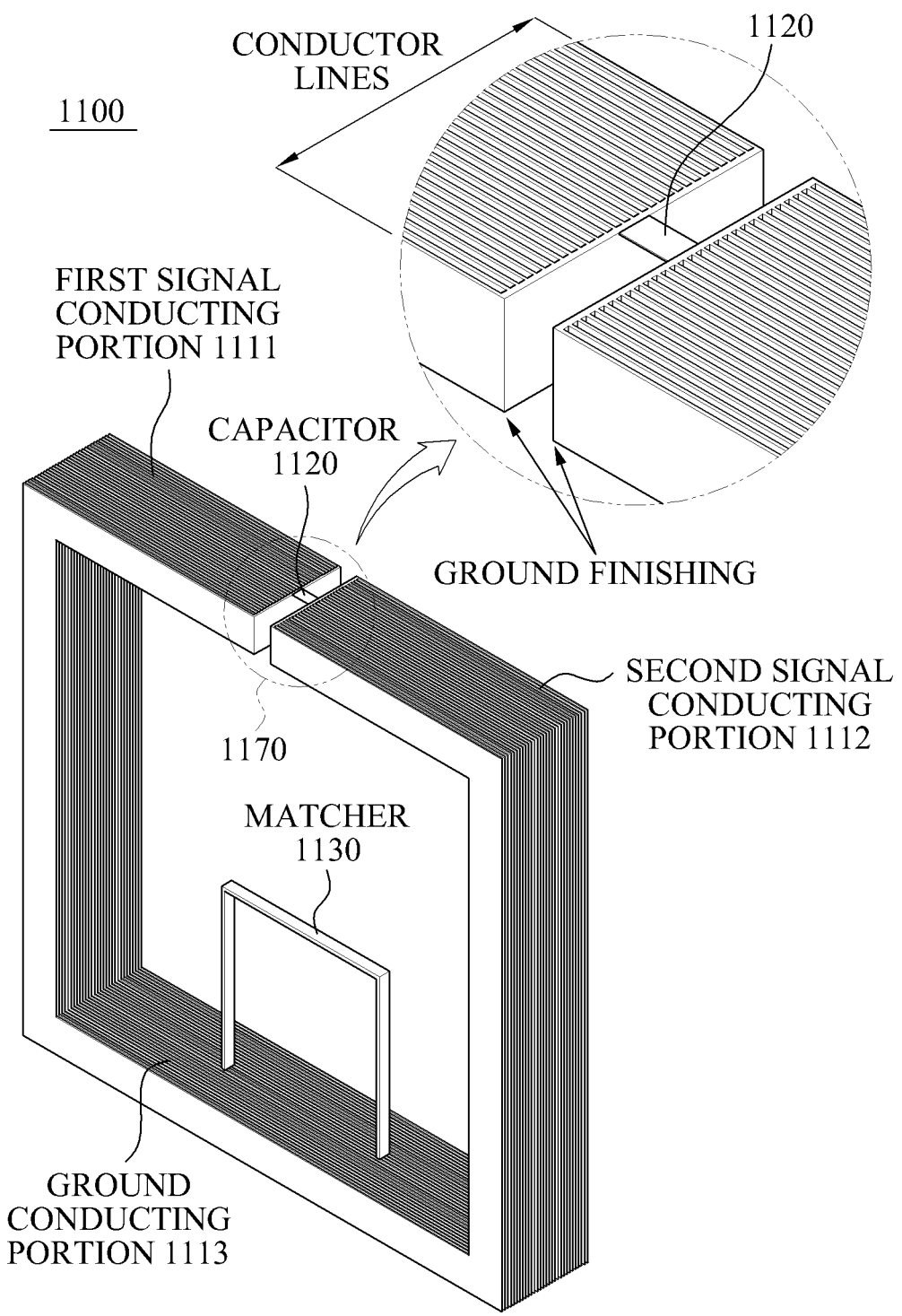

FIG. 11 illustrates an example of a resonator 1100 for a wireless power transmission using a parallel-sheet.

Referring to FIG. 11, the parallel-sheet may be applicable to each of a first signal conducting portion 1111 and a second signal conducting portion 1112 included in the resonator 1100.

Each of the first signal conducting portion 1111 and the second signal conducting portion 1112 may not be a perfect conductor and thus, may have a resistance. Due to the resistance, an ohmic loss may occur. The ohmic loss may decrease a Q-factor and also decrease a coupling effect.

By applying the parallel-sheet to each of the first signal conducting portion 1111 and the second signal conducting portion 1112, it is possible to decrease the ohmic loss, and to increase the Q-factor and the coupling effect. Referring to a portion 1170 indicated by a circle, when the parallel-sheet is applied, each of the first signal conducting portion 1111 and the second signal conducting portion 1112 may include a plurality of conductor lines. The plurality of conductor lines may be disposed in parallel, and may be shorted at an end portion of each of the first signal conducting portion 1111 and the second signal conducting portion 1112.

As described above, when the parallel-sheet is applied to each of the first signal conducting portion 1111 and the second signal conducting portion 1112, the plurality of conductor lines may be disposed in parallel. Accordingly, a sum of resistances having the conductor lines may decrease. Consequently, the resistance loss may decrease, and the Q-factor and the coupling effect may increase.

Figure 12:
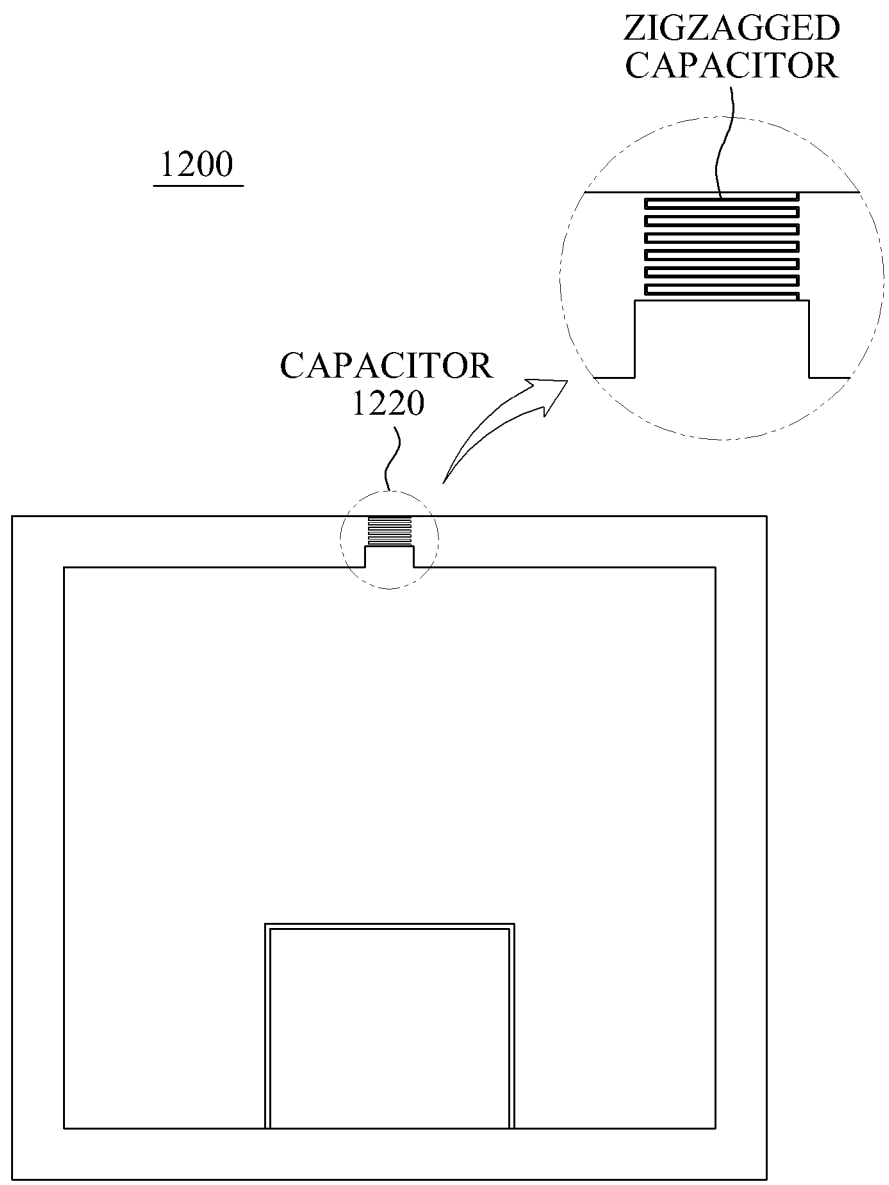

FIG. 12 illustrates an example of a resonator 1200 for a wireless power transmission, including a distributed capacitor.

Referring to FIG. 12, a capacitor 1220 included in the resonator 1200 for the wireless power transmission may be a distributed capacitor. A capacitor as a lumped element may have a relatively high equivalent series resistance (ESR). A variety of schemes have been proposed to decrease the ESR contained in the capacitor of the lumped element. According to an embodiment, by using the capacitor 1220 as a distributed element, it may be possible to decrease the ESR. As is known in the art, a loss caused by the ESR may decrease a Q-factor and a coupling effect.

As shown in FIG. 12, the capacitor 1220 as the distributed element may have a zigzagged structure. For example, the capacitor 1220 as the distributed element may be configured as a conductive line and a conductor having the zigzagged structure.

As shown in FIG. 12, by employing the capacitor 1220 as the distributed element, it may be possible to decrease the loss occurring due to the ESR. In addition, by disposing a plurality of capacitors as lumped elements, it may be possible to decrease the loss occurring due to the ESR. As a resistance of each of the capacitors as the lumped elements decreases through a parallel connection, active resistances of parallel-connected capacitors as the lumped elements may also decrease, such that the loss occurring due to the ESR may decrease. For example, by employing ten capacitors of 1 pF instead of using a single capacitor of 10 pF, it may be possible to decrease the loss occurring due to the ESR.

Figure 13A:
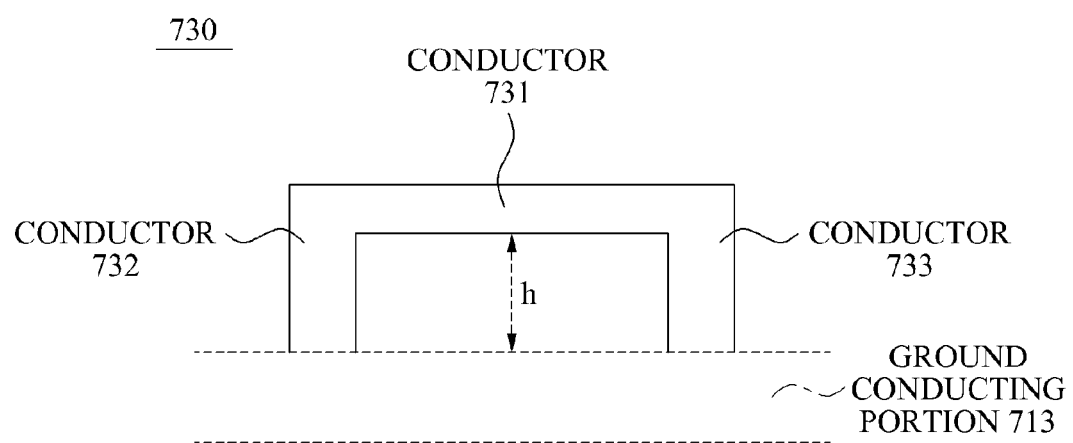
Figure 13B:
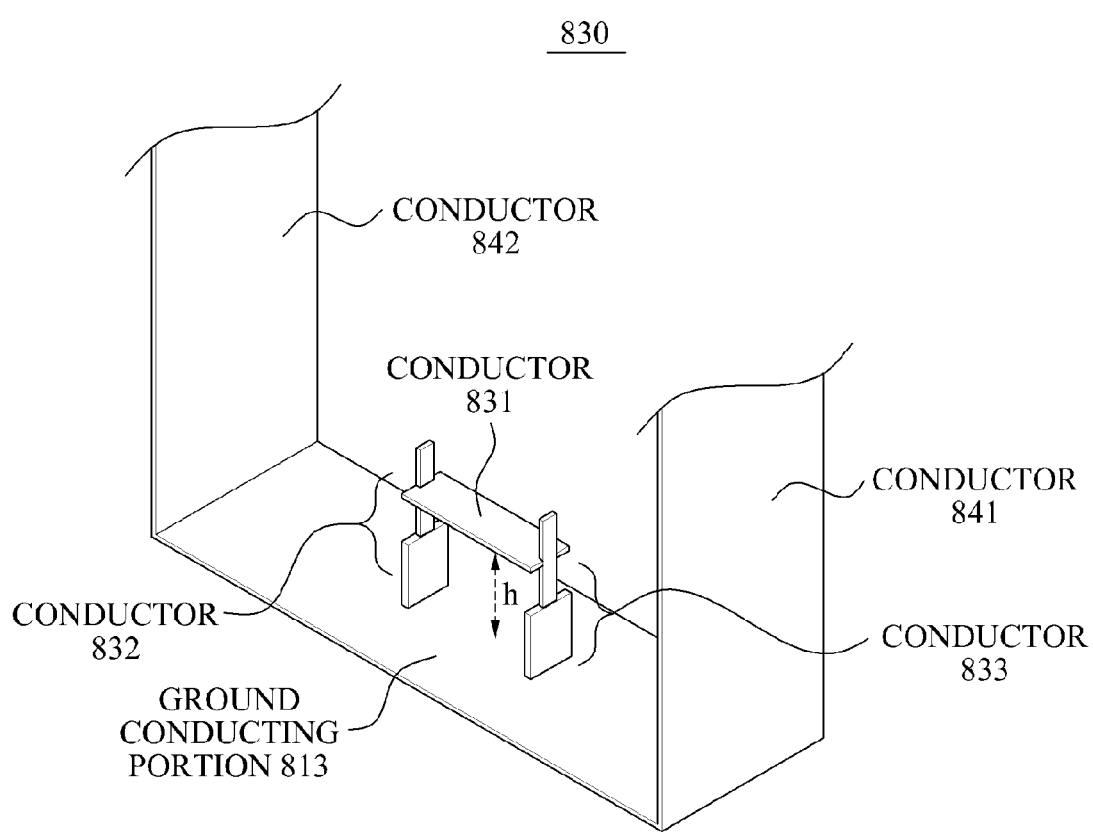

FIG. 13A illustrates an example of the matcher 730 used in the resonator 700 provided in the 2D structure of FIG. 7, and FIG. 13B illustrates an example of the matcher 830 used in the resonator 800 provided in the 3D structure of FIG. 8.

For example, FIG. 13A illustrates a portion of the 2D resonator including the matcher 730, and FIG. 13B illustrates a portion of the 3D resonator of FIG. 8 including the matcher 830.

Referring to FIG. 13A, the matcher 730 may include the conductor 731, a conductor 732, and a conductor 733. The conductors 732 and 733 may be connected to the ground conducting portion 713 and the conductor 731. The impedance of the 2D resonator may be determined based on a distance h between the conductor 731 and the ground conducting portion 713. The distance h between the conductor 731 and the ground conducting portion 713 may be controlled by the controller. The distance h between the conductor 731 and the ground conducting portion 713 may be adjusted using a variety of schemes. For example, the variety of schemes may include a scheme of adjusting the distance h by adaptively activating one of the conductors 731, 732, and 733, a scheme of adjusting the physical location of the conductor 731 up and down, and the like.

Referring to FIG. 13B, the matcher 830 may include the conductor 831, a conductor 832, and a conductor 833. The conductors 832 and 833 may be connected to the ground conducting portion 813 and the conductor 831. The conductors 832 and 833 may be connected to the ground conducting portion 813 and the conductor 831. The impedance of the 3D resonator may be determined based on a distance h between the conductor 831 and the ground conducting portion 813. The distance h between the conductor 831 and the ground conducting portion 813 may be controlled by the controller. Similar to the matcher 730 included in the 2D structured resonator, in the matcher 830 included in the 3D structured resonator, the distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Although not illustrated in FIGS. 13A and 13B, the matcher may include an active element. A scheme of adjusting an impedance of a resonator using the active element may be similar as described above. For example, the impedance of the resonator may be adjusted by changing a path of a current flowing through the matcher using the active element.

Figure 14:
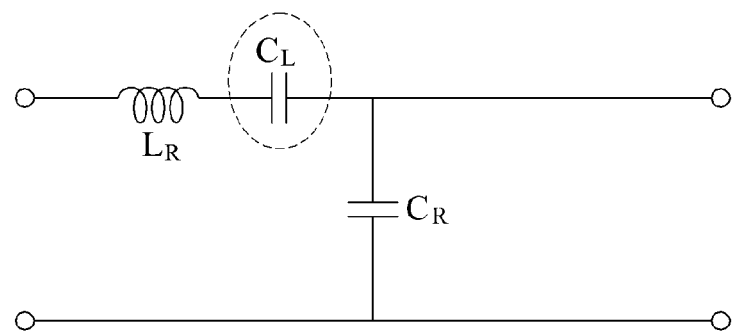
FIG. 14 is a diagram illustrating an example of an equivalent circuit of the resonator for a wireless power transmission of FIG. 7.

FIG. 14 illustrates an example of an equivalent circuit of the resonator 700 for the wireless power transmission of FIG. 7.

The resonator 700 for the wireless power transmission may be modeled to the equivalent circuit of FIG. 14. In the equivalent circuit of FIG. 14, $C_L$ denotes a capacitor that is inserted in a form of a lumped element in the middle of the transmission line of FIG. 7.

As an example, the resonator 700 may have a zeroth resonance characteristic. For example, when a propagation constant is "0", the resonator 700 may be presumed to have $\omega_{MZR}$ as a resonance frequency. The resonance frequency $\omega_{MZR}$ may be expressed by Equation 3.

$$\omega_{MZR} = \frac{1}{\sqrt{L_R C_L}} \quad \text{[Equation 3]}$$

In Equation 3, "MZR" denotes a Mu zero resonator.

Referring to Equation 3, the resonance frequency $\omega_{MZR}$ of the resonator 700 may be determined by $L_R/C_L$. A physical size of the resonator 700 and the resonance frequency $\omega_{MZR}$ may be independent with respect to each other. Since the physical sizes are independent with respect to each other, the physical size of the resonator 700 may be sufficiently reduced.

According to embodiments, a reflected power generated inside or outside in a resonance power transmission system may be efficiently reused and thus, it is possible to increase an energy efficiency. Additionally, the reflected power may be used to charge a third party device, or may be used as an auxiliary power of a module for communication of a transmission system or as an auxiliary power of the resonance power transmission system.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like, consistent with that disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reflected energy management apparatus for resonance power transmission, the reflected energy management apparatus comprising:
   a source resonator configured to transmit a transmission power to a target resonator; and
   a reflected power management unit configured to:
       detect a reflected wave in response to the transmission power being transmitted to the target resonator; and
       generate a reflected power using the detected reflected wave, wherein the reflected power is used as a DC voltage, and
   wherein a power transfer efficiency is determined based on a ratio between a square of the transmission power and a square of the reflected power and further based on a level of impedance matching in a resonance frequency.

2. The reflected energy management apparatus of claim 1, wherein the reflected power management unit comprises:
   a coupler configured to detect the reflected wave by electrical coupling;
   a rectifier configured to generate a direct current (DC) power by rectifying the reflected wave detected by the coupler; and
   a charging unit configured to store the DC power.

3. The reflected energy management apparatus of claim 1, wherein the reflected power management unit comprises:
   a coupler configured to detect the reflected wave by electrical coupling;
   a rectifier configured to generate a DC voltage by rectifying the reflected wave detected by the coupler; and
   a DC-to-DC (DC/DC) converter configured to provide the DC voltage as an auxiliary power of a resonance power transmission apparatus.

4. The reflected energy management apparatus of claim 1, further comprising:
   a circulator configured to:
       provide the source resonator with a power input from a resonance power transmission apparatus; and
       provide the reflected power management unit with the reflected wave.

5. A reflected energy management apparatus for resonance power transmission, the reflected energy management apparatus comprising:
   a coupler configured to detect a reflected wave in response to a transmission power being transmitted to a target resonator by electrical coupling, the reflected wave being generated in a resonance power transmission system;
   a rectifier configured to generate a DC power by rectifying the reflected wave detected by the coupler; and
   a charging unit configured to store the DC power,
   wherein the reflected energy management apparatus generates a reflected power using the reflected wave,
       wherein a power transfer efficiency is determined based on a ratio between a square of the transmission power and a square of the reflected power and further based on a level of impedance matching in a resonance frequency.

6. A reflected energy management method for resonance power transmission, the method comprising:
   transmitting, by a source resonator, a transmission power to a target resonator; and
   detecting, by a reflected power management unit, a reflected wave in response to the transmission power being transmitted to the target resonator; and
   generating, by the reflected power management unit, a reflected power using the detected reflected wave, wherein the reflected power is used as a DC voltage, and
   wherein a power transfer efficiency is determined based on a ration between a square of the transmission power and a square of the reflected power and further based on a level of impedance matching in a resonance frequency.

7. The method of claim 6, further comprising:
   detecting the reflected wave by electrical coupling;
   generating a direct current (DC) power by rectifying the detected reflected wave; and
   storing the DC power.

8. The method of claim 6, further comprising:
   detecting the reflected wave by electrical coupling;
   generating a DC voltage by rectifying the detected reflected wave; and
   providing the DC voltage as an auxiliary power of a resonance power transmission apparatus.

9. The method of claim 6, further comprising:
providing the source resonator with a power input from a resonance power transmission apparatus; and
providing the reflected power management unit with the reflected wave.

10. A reflected energy management method for resonance power transmission, the method comprising:
detecting, by a coupler, a reflected wave in response to a transmission power being transmitted to a target resonator by electrical coupling, the reflected wave being generated in a resonance power transmission system;
generating, by a rectifier, a DC power by rectifying the reflected wave detected by the coupler; and
storing, by a charging unit, the DC power,
wherein a reflected power is generated using the reflected wave, and
a power transfer efficiency is determined based on a ratio between a square of the transmission power and a square of the reflected power and further based on a level of impedance matching in a resonance frequency.

11. The reflected energy management apparatus of claim 1, wherein the reflected power management unit is configured to detect the reflected wave by a Voltage Standing Wave Ratio (VSWR) of the source resonator.

12. The reflected energy management apparatus of claim 1, further comprising:
a circulator comprising a first terminal and a second terminal, wherein
the first terminal is connected to one of an AC/DC converter, a frequency generator, a power amplifier, and a coupler, and
the second terminal is connected to the source resonator.

13. The reflected energy management apparatus of claim 1, wherein at least one of a source resonator and a target resonator is an epsilon negative, mu negative, a double negative, a negative refractive index, or a left-handed, material.

14. The reflected energy management apparatus of claim 1, wherein at least one of a source resonator and a target resonator further comprises a matcher configured to adjust the impedance of the source resonator and/or target resonator in response to the detected reflected wave.

15. The reflected energy management apparatus of claim 14, wherein the matcher is configured to adjust the impedance of the source resonator and/or target resonator by detecting a resonance point.

16. The reflected energy management apparatus of claim 14, wherein the matcher is configured to adjust the impedance of the source resonator and/or target resonator by changing the physical shape of the matcher.

17. The reflected energy management apparatus of claim 5, wherein the reflected energy management apparatus is configured to detect the reflected wave by a Voltage Standing Wave Ratio (VSWR) of the source resonator.

18. The method of claim 6, further comprising adjusting the impedance of the source resonator and/or target resonator in response to the detected reflected wave.

19. The method of claim 6, further comprising adjusting the impedance of the source resonator and/or target resonator in response to the detected reflected wave based on a control signal.

20. The method of claim 18, wherein the adjusting comprises detecting a resonance point.

* * * * *